United States Patent [19]

French

[11] 4,201,615

[45] May 6, 1980

[54] APPARATUS FOR APPLYING AN ADHESIVE TO A BOOK

[75] Inventor: Lionel J. B. R. French, London, England

[73] Assignee: The Sulby Engineering Development Company Limited, London, England

[21] Appl. No.: 943,380

[22] Filed: Sep. 18, 1978

Related U.S. Application Data

[63] Continuation of Ser. No. 828,103, Aug. 26, 1977, abandoned.

[30] Foreign Application Priority Data

Sep. 10, 1976 [GB] United Kingdom ............... 37663/76

[51] Int. Cl.[2] ...................... B29C 19/00; B42C 19/00; B05C 11/02

[52] U.S. Cl. .................................... 156/304; 156/305; 156/578; 118/100; 118/407; 427/356; 11/1 AD

[58] Field of Search ....................... 156/304, 305, 578; 11/1 AD, 1 B; 118/100, 101, 410–413, 407; 427/284, 285, 355, 356, 358

[56] References Cited

U.S. PATENT DOCUMENTS

| | | | |
|---|---|---|---|
| 44,952 | 11/1864 | Henze | 118/413 |
| 1,733,006 | 10/1929 | Cook | 427/358 |
| 2,605,739 | 8/1952 | Florez | 11/1 AD |
| 2,745,129 | 5/1956 | Johnson | 427/358 |
| 3,179,967 | 4/1965 | Yohn | 11/1 AD |
| 3,767,457 | 10/1973 | Hubbard | 427/355 |

*Primary Examiner*—Douglas J. Drummond
*Attorney, Agent, or Firm*—Stevens, Davis, Miller & Mosher

[57] ABSTRACT

An apparatus for applying an adhesive to the back of a book has a compressing plate inclined at an angle with respect to horizontal to provide a gap between the plate and book surface which converges in the direction the book travels whereby the adhesive layer is gradually compressed and pressed into the back of the book.

3 Claims, 6 Drawing Figures

APPARATUS FOR APPLYING AN ADHESIVE TO A BOOK

This is a continuation of application Ser. No. 828,103 filed Aug. 26, 1977.

This invention relates to the application of adhesives to articles with particular reference to the preparation of the backs of books for receiving a cover. In this specification the word "book" is used to denote a collated assembly of pages to which a cover is applied. The pages of the book can be stitched or stapled together or simply secured by the adhesive applied to the back.

It is essential, particularly when no stitching or stapling is used, that the adhesive is firmly and intimately applied. The object of this invention is to provide a method and apparatus which ensures the intimate application of the adhesive to the book back with penetration of the adhesive into the fibres of the paper in each page.

According to the present invention there is provided a method of preparing an article for adhesive securement, such method comprising applying adhesive to the article and causing relative movement between the article and a compressing surface, the article and the surface being so inclined relatively to one another that the gap between the article and the surface progressively diminishes during the said movement to press adhesive into the article.

According to another aspect of the invention an apparatus for carrying out the method described above comprises an element providing the compressing surface, means for moving a book over the said surface with the back thereof spaced from the surface by a gap, the said surface being so inclined that the gap diminishes in the direction of movement, and means for introducing adhesive into the said gap.

Preferably the book back is confined by walls as it moves over the compressing surface. These walls prevent the escape of adhesive thereby achieving the maximum compressing effect.

The invention will now be described by way of example and with reference to the accompanying informal drawings wherein.

Figure 1:
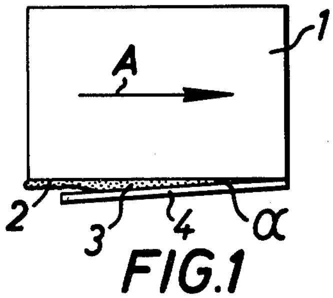
FIG. 1 is a diagrammatic representation of a book having the back thereof coated with adhesive by the method of the invention.

Referring initially to FIG. 1 a book 1 is depicted as moving in a horizontal plane from left to right in the direction of the arrow A. The back surface 2 of the book carries a layer 3 of adhesive. A rigid compressing plate 4 is inclined at a small angle $\alpha$ to the horizontal so that the gap between the upper surface of the plate 4 and the book back 1 converges in the direction of the arrow A. As the book 1 moves in the direction of the arrow A the adhesive layer 3 is gradually compressed and during this compression a high pressure of adhesive is attained. The adhesive is thus thoroughly pressed into the back of the book to impregnate the fibres in each sheet of paper. In a typical embodiment of the invention the angle $\alpha$ is 1°.

Figure 2:
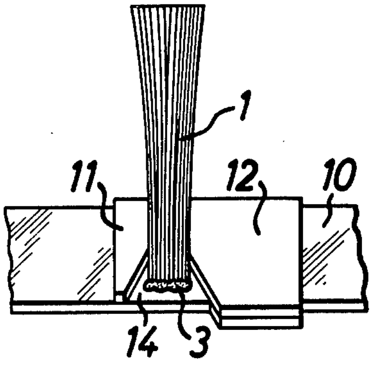
FIGS. 2 and 3 are schematic views of an apparatus in accordance with the invention, FIG. 3 being drawn on a larger scale.
Figure 3:
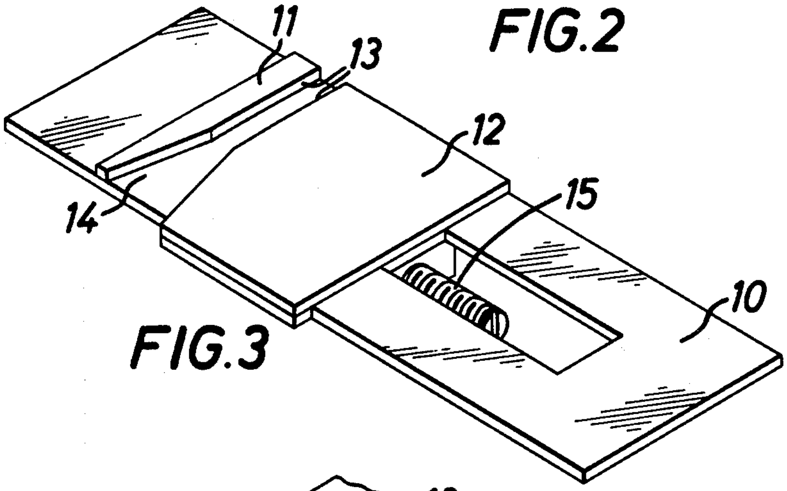

Turning now to FIGS. 2 and 3 of the drawings a schematic apparatus illustrated therein comprises a compressing plate 10 and guide members 11 and 12 defining walls 13 which confine the pages of the book 1 as it passes therethrough. The guide members 11 and 12 are cut away at the book entry part to define a throat 14 providing a ready entry for the book. The adhesive layer 3 is compressed by the inclined plate 10 in the manner described with reference to FIG. 1.

In order to accommodate books of different thicknesses by varying the width of the gap between walls 13 the guide member 12 is adjustably mounted as can be seen best in FIG. 3 of the drawings, the guide member 12 being slidable on plate 1 laterally of the gap, this sliding being controlled by a threaded stem 15.

Figure 4:
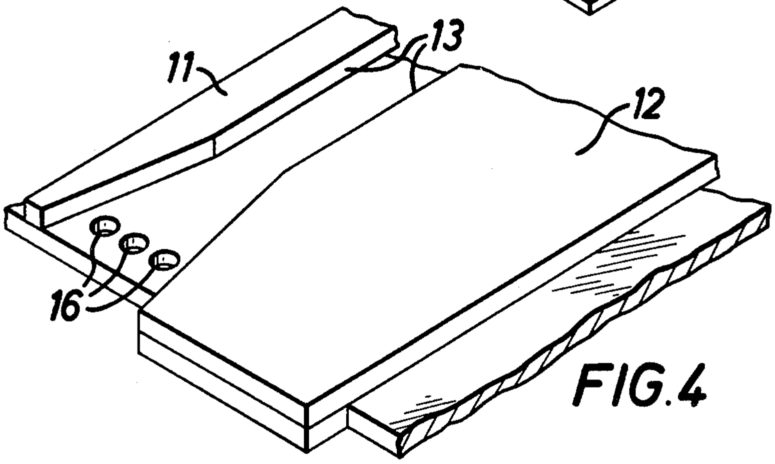
FIG. 4 is a view of part of the apparatus of FIGS. 2 and 3 on an enlarged scale.
Figure 5:
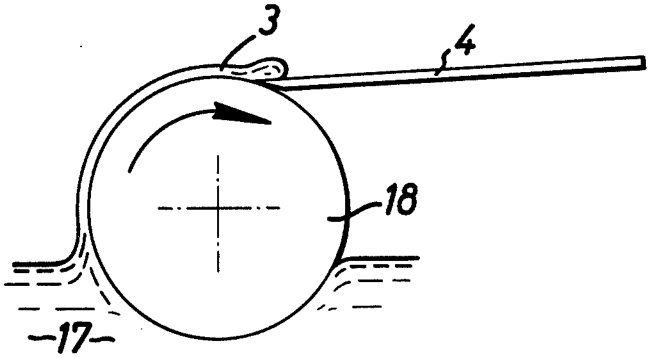
FIGS. 5 and 6 are diagrammatic views similar to FIG. 1 indicating alternative methods of applying adhesive to the book back.
Figure 6:
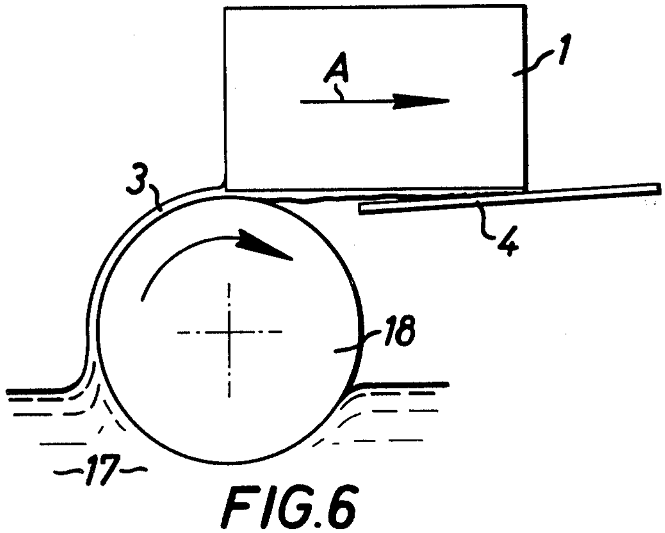

Viscous liquid adhesive can be applied to the book back by any of the methods illustrated in FIGS. 4 to 6. In FIG. 4, which is a part of the apparatus of FIGS. 2 and 3, three entry holes 16 for adhesive are provided in the plate 1 in the region of the entry part of the passage defined between guide members 11 and 12.

Alternatively as illustrated in FIG. 5 a driven roller 18 partially immersed in a reservoir 17 of adhesive can convey the adhesive as a layer 3 onto the entry end of plate 4. As an alternative as illustrated in FIG. 6 the layer 3 can be conveyed onto the back of book 1 and this is at present the preferred method of applying adhesive.

I claim:

1. Apparatus so constructed and arranged as to be capable of preparing a book for adhesive securement, said apparatus comprising an element providing a flat compressing surface, means for moving a book over the said surface with the back thereof spaced from the surface by a gap, the said surface being so inclined that the gap diminishes in the direction of movement, means for introducing adhesive into the said gap, and wall members to enhance compression of adhesive at each side of the gap to confine the book and prevent escape of adhesive thereby.

2. Apparatus as claimed in claim 1 wherein one of the walls is laterally adjustable.

3. Apparatus as claimed in claim 1 wherein the means for introducing adhesive into the gap comprises apertures connecting a source of adhesive to the entry of the gap.

* * * * *